United States Patent [19]

Shioi et al.

[11] 4,150,936

[45] Apr. 24, 1979

[54] APPARATUS FOR PRESS FORMING SHADOW MASKS

[75] Inventors: Hideji Shioi; Tsuneo Furukawa, both of Mobara; Hiroaki Kouchi, Akashi; Kazuo Nishimatsu, Himeji, all of Japan

[73] Assignee: Hitachi, Ltd., Japan

[21] Appl. No.: 900,004

[22] Filed: Apr. 25, 1978

[30] Foreign Application Priority Data

Oct. 26, 1977 [JP] Japan .................. 52-127533

[51] Int. Cl.² ............... B29C 7/00; B29C 17/00
[52] U.S. Cl. ................... 425/397; 425/388
[58] Field of Search ................ 425/397, 387

[56] References Cited

U.S. PATENT DOCUMENTS

| | | | |
|---|---|---|---|
| 3,635,622 | 1/1972 | Wechsler | 425/397 X |
| 3,702,749 | 11/1972 | Flusfeder et al. | 425/397 X |
| 3,890,079 | 6/1975 | Slater | 425/397 X |
| 3,964,237 | 6/1976 | Johansen | 425/397 X |

Primary Examiner—J. Howard Flint, Jr.
Attorney, Agent, or Firm—Craig & Antonelli

[57] ABSTRACT

An apparatus for press forming shadow masks comprises a press unit for press forming mask blanks, a feeder unit for automatically feeding the blanks, one by one, to the lower die of the press unit, and a takeout unit for automatically removing formed masks from the press unit. The feeder unit includes a pallet for supporting a stack of mask blanks and a pad beam for supplying the blanks, one by one, from the pallet to the lower die. The pallet and the lower die are provided with locating means, respectively, for the mask blanks and the pad beam.

8 Claims, 21 Drawing Figures

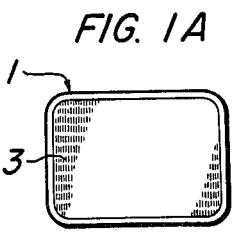
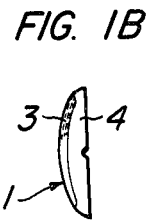
FIG. 1A  FIG. 1B
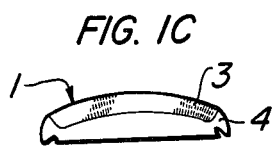
FIG. 1C
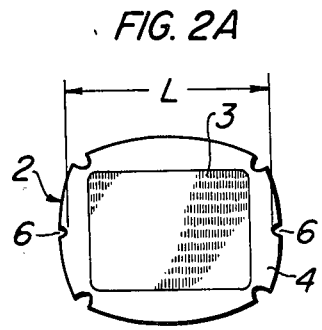
FIG. 2A  FIG. 2B
FIG. 2C
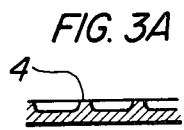
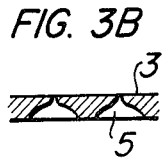
FIG. 3A  FIG. 3B

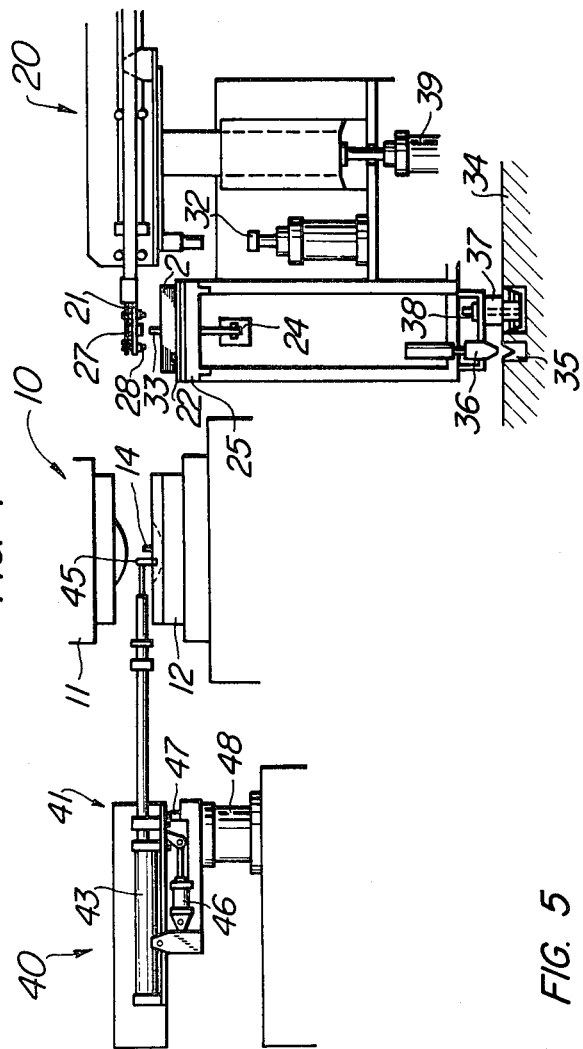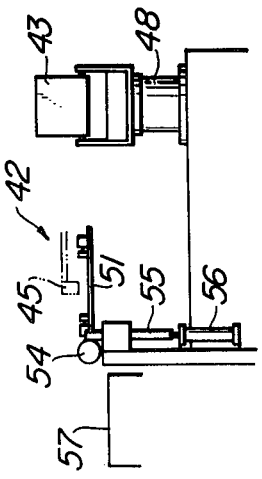

APPARATUS FOR PRESS FORMING SHADOW MASKS

This invention relates to an apparatus for forming shadow masks (hereinafter called "masks"), and more particularly to an apparatus for working mask blanks, formed with numerous slots in advance, by press forming.

The mask for a 14-inch color cathode-ray tube, for example, is perforated with approximately 200,000 slots, about 0.16 mm by about 0.74 mm each. The mask is a rectangular oval in shape, the major axis measuring 300 mm and the minor axis 200 mm. For the manufacture of such masks, the mask blanks of sheet metal about 0.15 mm in thickness and slotted beforehand must be formed to a partial spherical shape.

Then, in locating each such blank on the cavity of the forming die, it is necessary to place it exactly curvedly along the spherical configurations of the mating die members. Otherwise, the pitch of slots would be disturbed during the press forming, resulting in undesirable deformation which causes un-uniformity in light transmission.

In order to avoid the deformation, it is importnt that the blank be set securely on the spherical surface of the die cavity within a tolerance of not more than 0.1 mm relative to the locator pins of the die. This has rendered automatic feed of mask blanks to forming presses difficult. Qualitatively the formed masks are under severe conditions because of its shaped, material, and usage, and also because they are made of a thin sheet the masks can be easily deformed and are delicate for handling. Moreover, since a common practice is to form masks of several different sizes or shapes on a single press, the operation plan is usually too complex to allow for automatic feed and takeout. For these reasons it has been customary to feed the blanks to the press and take the formed parts out all by hand.

The object of the present invention is to overcome those difficulties of the prior art and provide an apparatus for press forming shadow masks, which is capable of automatic feeding of blanks and automatic takeout of the products.

The invention will be described in more detail below with reference to the accompanying drawings showing preferred embodiments thereof. In the drawings:

FIG. 1A is a front view of a mask press formed by the apparatus according to this invention;

FIG. 1B is a side view of the mask shown in FIG. 1A;

FIG. 1C is a bottom view of the mask in FIG. 1A;

FIG. 2A is a plan view of a mask blank to be worked into the mask shown in FIG. 1A;

FIG. 2B is a side view of the blank shown in FIG. 2A;

FIG. 2C is a bottom view of the blank in FIG. 2A;

FIG. 3A is an enlarged sectional view of the skirt of the mask blank shown in FIG. 2A;

FIG. 3B is an enlarged sectional view of the slotted zone of the mask blank in FIG. 2A;

FIG. 4 is a front view of a shadow mask press-forming apparatus embodying the invention;

FIG. 5 is a front view of the reversing mechanism of the apparatus shown in FIG. 4;

Figure 6:
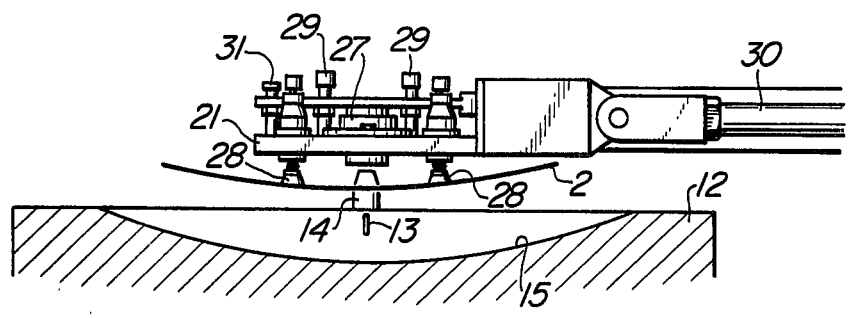
FIG. 6 is an enlarged front view of the pad beam of the apparatus shown in FIG. 4.

As inciated generally at 1 in FIGS. 1A, 1B, and 1C, the mask press formed by the apparatus of the invention is made of a thin sheet about 0.15 mm in thickness and substantially rectangular in shape. The mask 1 consists of a slotted zone 3 having approximately 200,000 slots formed in the sheet and surrounded by a continuous skirt 4 extended along all four edges.

The mask 1 is fabricated by press forming a mask blank 2 of sheet material as shown in FIGS. 2A, 2B, and 2C which has the above-mentioned slotted zone 3 with numerous slots 5 and curled beforehand in the direction of its minor axis by a leveler (not shown) to a curvature generally corresponding to the cavity contour of a lower die 12 to be described later. The portions of the skirt 4 adjacent to the both sides of the slotted zone 3 are formed with a pair of notches 6, spaced a distance L apart, for the purpose to be explained later.

The skirt 4 is regularly pitted as shown in section in FIG. 3A, and the slots 5 of the slotted zone 3 are of a contour as in FIG. 3B.

The apparatus for press forming shadow masks in accordance with the invention, as schematically illustrated in FIG. 4, comprises a press unit 10 for press forming the mask blanks 2, a feeder unit 20 for supplying the mask blanks 2 to the press units 10, and a takeout unit 40 for removing the formed masks 1 from the press unit 10. The constructions of these units will now be described in the order mentioned.

The press unit 10 comprises an upper die 11 having a projection of a contour conforming to that of the formed mask 1, and a lower die 12 having a cavity of a contour adapted to mate with the projection of the upper die 11.

Figure 7:
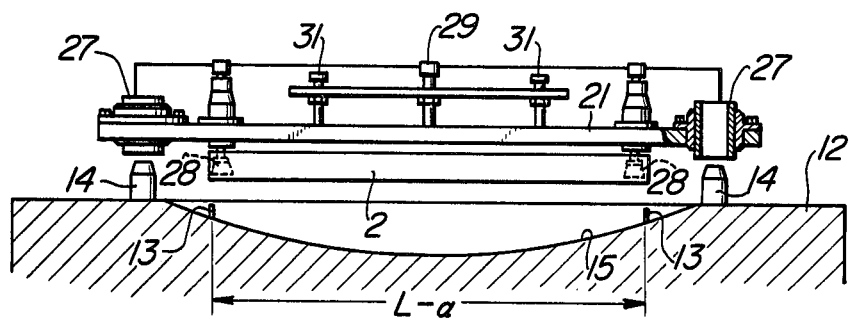
FIG. 7 is a side view of the pad beam shown in FIG. 6.

As best shown in FIGS. 6 and 7, a pair of locator pins 13 are set upright on the lower die 12 so as to keep the curled mask blank 2 on the spherical surface of the cavity 15 of the lower die 12. The two pins 13 are spaced apart a distance L − α, that is, the distance L between the notches 6 of the blank 2 in the free, unstrained state minus the allowance α for area shrinkage which will result from the forming of the workpiece along the spherical contour of the cavity 15.

Guide pins 14 for locating a pad beam 21 of the feeder unit 20 to be described later is also set upright on the lower die 12.

Figure 8A:
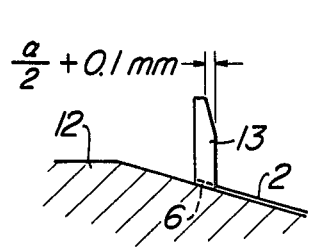
FIG. 8A is an enlarged front view of one of the locator pins set on the press unit of the apparatus shown in FIG. 4.

Each locator pin 13 is tapered, as indicated in FIG. 8A, with the inner end portion thinned out upwardly to a final taper of about $(\alpha/2)+0.1$ mm so as to provide ease of register with the corresponding notch 6 of the mask blank 2.

Figure 8B:
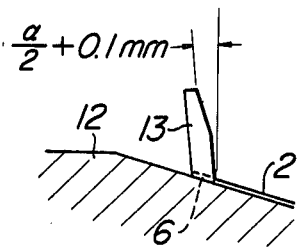
FIG. 8B is a front view of a modified form of the locator pin shown in FIG. 8A.

The tapered locator pin 13 may be tilted outwardly as shown in FIG. 8B for greater ease of fitting in the notch 6 of the workpiece.

Figure 9:
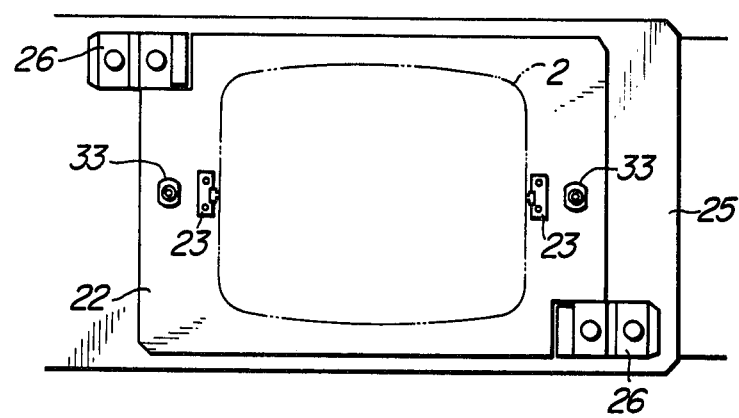
FIG. 9 is an enlarged plan view of the pallet for the feeder unit of the apparatus shown in FIG. 4.

The feeder unit 20 includes a pallet 22, as depicted in FIG. 4, on which a number of curled mask blanks 2 are stacked. As shown in FIGS. 4 and 9, this pallet 22 has locator pins 23 provided at points corresponding to the dimension L of the mask blanks 2. The pallet 22 is shown fixed to a traversing truck 25, which is moved laterally by a traversing cylinder 24, with some allowance by locator guides 26. A pad beam 21 held above the pallet 22 to suck up the mask blanks 2, one by one, from the pallet. As can be seen from FIGS. 4, 6, and 7, the pad beam 21 carries guide bushes 27 adapted for sliding engagement with the guide pins 14 of the lower die 12, mask-sucking pads 28 for lifting each mask blank 2 by vacuum action and then releasing the same, and a pair of air-blowing nozzles 29. The pad beam 21 is secured with some allowance to the end of a reciprocating piston 30 by sets of bolts and nuts 31. The cylinder 30 is mounted on a lifting cylinder 39, and the upper and lower limits for movement of the lifting cylinder 39 are defined by microswitches (not shown) attached to (the pad beam 21), and by (a cylinder 32). Guide pins 33 are set on the pallet 22 for sliding engagement with the guide bushes 27.

With the construction described the feeder unit 20 is equipped with rail rollers (not shown) and is movably placed on the floor 34. It is positioned by inserting a jack ram cylinder 36 of the feeder unit 20 into a tapered hole of a rail 35 laid on the floor 34. The feeder unit 20 is then made fast on the floor by the combination of a frame-fixing spacer 37 and a nut 38.

Figure 10A:
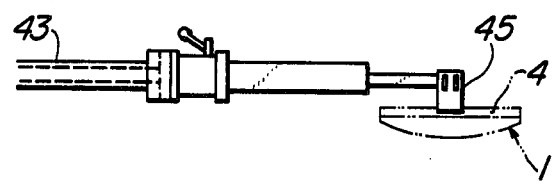
FIG. 10A is an enlarged front view of the chuck mechanism for the takeout unit of the apparatus shown in FIG. 4.
Figure 10B:
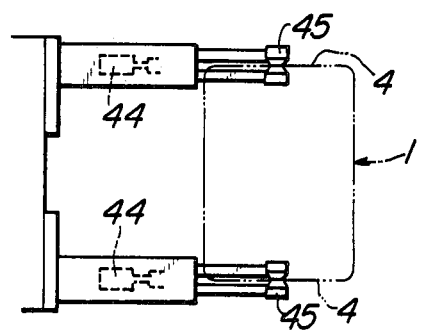
FIG. 10B is a plan view of the chuck mechanism shown in FIG. 10A.

The takeout unit 40 comprises a takeout mechanism 41 shown in FIG. 4 and a reversing mechanism 42 in FIG. 5. The takeout mechanism 41, as shown in FIGS. 4, 10A, and 10B, comprises two pairs of takeout chucks 45 to be opened and closed by chuck cylinders 44 (FIG. 10B) which, in turn, are secured to the front end of a take-out cylinder 43 of the takeout mechanism 41, a cylinder 46 for raising and lowering the takeout cylinder 43, a stopper 47 defining the lower position of the takeout cylinder 43, and a swing mechanism 48 for swinging the takeout cylinder 43 horizontally through an angle of 90 deg.

Figure 11A:
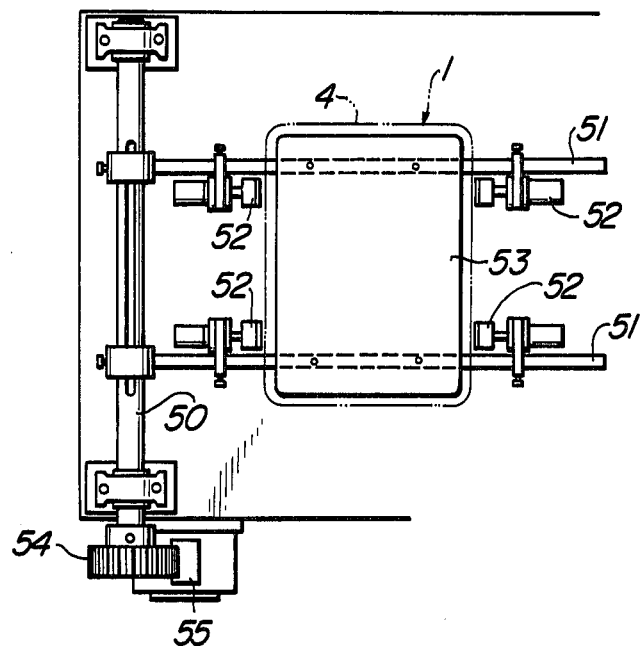
FIG. 11A is an enlarged plan view of the reversing mechanism for the takeout unit of the apparatus shown in FIG. 4.
Figure 11B:
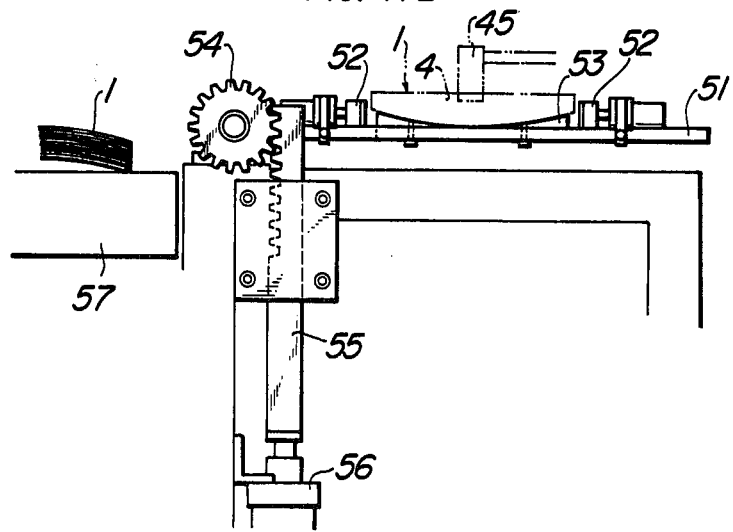
FIG. 11B is a front view of the reversing mechanism shown in FIG. 11.

The reversing mechanism 42, as better shown in FIGS. 11A and 11B, includes a reversing shaft 50 which supports a pair of reversing arms 51. A total of four chuck cylinders 52 and a receiving plate 53 of rubber are mounted on the reversing arms 51. The reversing arms 51 are connected to the reversing shaft 50, and the chuck cylinders 52 to the reversing arms 51, both slidably and in such a manner as to be fixed at desired points. A pinion 54 is mounted on one end of the reversing shaft 50, and a rack 55 in mesh with the pinion is raised and lowered by a reversing cylinder 56, so that the reversing arms 51 can turn through an angle of 180 deg. with a formed mask 1 carried by the receiving plate. For intermittent delivery of the formed mask 1 from the receiving plate 53 that has been reversed 180 deg. by the rack 55 and the pinion 54, a conveyor 57 is installed adjacent the reversing mechanism 42.

Figure 12A:
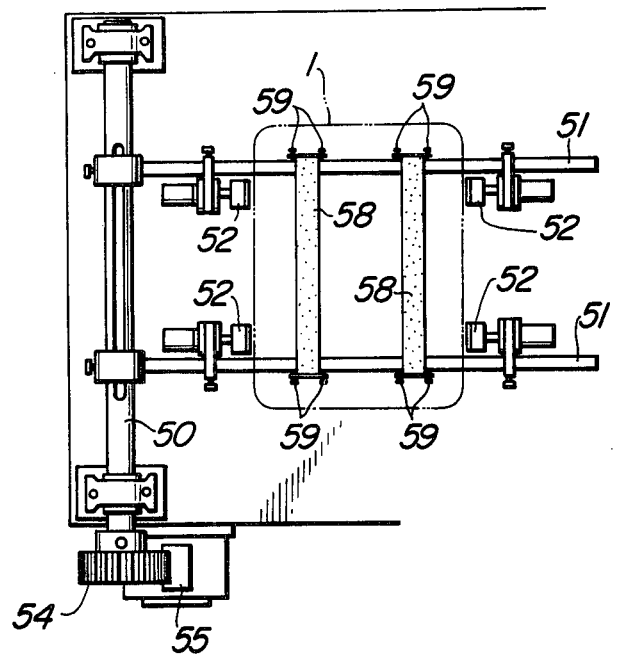
FIG. 12A is a plan view of another embodiment of the reversing mechanism shown in FIG. 11A.
Figure 12B:
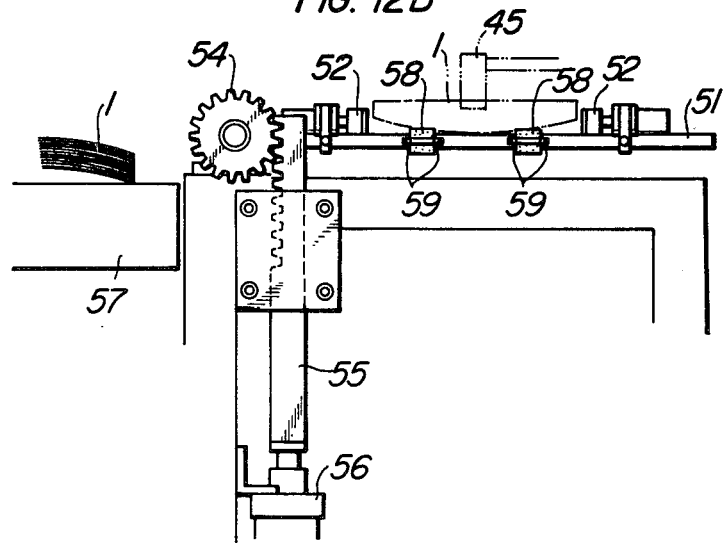
FIG. 12B is a front view of the reversing mechanism shown in FIG. 12A.

FIGS. 12A and 12B illustrate a modified form of the reversing mechanism 42, in which a pair of rubber strips 58 are used in lieu of the receiving plate 53. The rubber strips 58 are secured to the reversing arms 51, for example, by butterfly nuts 59 in such a manner that the tension, slack, and length of each strip can be adjusted with ease. The rubber strips 58, which thus replace the receiving plate, are readily adjustable for different types of workpieces and are capable of receiving each formed mask with suitable tension.

The operation of the apparatus with the foregoing construction will now be described. In preparation for the operation, the guide bushes 27 of the pad beam 21 are set on the guide pins 14 of the lower die 12, the cylinder 30 is moved to the advanced position, and the pad beam 21 is secured to the end of the cylinder 30 by bolts and nuts 31. Then, the cylinder 30 is caused to recede, and the pallet 22 is fixed to the traversing truck 25 by the locator guides 26, with the guide pins 33 of the pallet 22 in sliding engagement with the guide bushes 27. By the procedure so far described the pad beam 21 is operated so that, when it repeatedly reciprocates between the lower die 12 and the pallet 22, it can locate each mask blank 2 with a high degree of accuracy, for example, within a tolerance of about 0.1 mm.

Next, a plurality (for example, hundreds) of mask blanks 2, curled in advance, are stacked on the pallet 22, with their notches 6 set in register with the locator pins 23. As the pad beam 21 operates, the mask blanks 2 are sucked up, one by one, by the four pairs of mask-sucking pads 28, carried forward by the cylinder 30, and fed to the lower die 12 of the press unit 10. After the notches 6 of each such blank 2 have been brought into partial register with the locator pins 13, the vacuum in the sucking pads 28 is broken and the blank 2 is released from the pad. Immediately upon this release, jets of clean air are given by the pair of air-blowing nozzles 29 to force the mask blank 2 against the spherical surface of the cavity 15 in the lower die 12 and fit the notches 6 of the blank in complete register with the locator pins 13. The pad beam 21 is then withdrawn to its original position by the cylinder 30.

Following this, the upper die 11 descends and presses down the mask blank 2 against the lower die 12 to the spherical shape of the formed mask 1 shown in FIG. 1. The mask 1 just press formed, with the slotted zone 3 directed downward and the surrounding skirt 4 upward, is gripped at middle points of the both side edges of the skirt by the pair of takeout chucks 45 which are opened and closed by the chuck cylinder 44. The mask is thus raised by the cylinder 46, the takeout cylinder 43 recedes, and the swing mechanism 48 swings through an angle of 90 deg., so that the mask is securely placed on the receiving plate 53 of a contour corresponding to the curvature of the slotted zone 3 of the mask. Next, the two pairs of chuck cylinders 52 hold the mask by the both side portions of the skirt 4, and the reversing cylinder 56 operates through the rack 55 and the pinion 54 to cause a 180 deg. reversal of the receiving plate 53, thus stacking several masks 1, with their skirts 4 facing downward, on the conveyor 57 for intermittent delivery. In the sequential manner above described, continuous press forming of mask blanks to manufacture shadow masks is performd with automatic feed of the blanks and automatic takeout of the products.

What is claimed is:

1. An apparatus for press forming shadow masks, comprising a press unit which includes a set of upper and lower forming dies for mask blanks, a feeder unit for automatically feeding said blanks, one by one, to the lower die of said press unit, and a takeout unit for automatically taking out the formed masks from said press unit, said lower die of said press unit having locator means for locating each said mask blank for press forming, said feeder unit including a pallet equipped with locator means for supporting a stack of mask blanks and also including a pad beam for carrying and feeding each said mask blank from said pallet to said lower die of said press unit, and said takeout unit including takeout means for each said formed mask from said lower die and also including reversing means for reversing said takeout means and thereby allowing the same to place said mask on a conveyor.

2. An apparatus according to claim 1, wherein said pad beam includes mask-sucking pads for lifting each said mask blank by the vacuum action.

3. An apparatus according to claim 2, wherein said pad beam includes air-blowing nozzles for bringing each said mask blank into register with said locator means of said lower die.

4. An apparatus according to claim 1, wherein said blank locator means of said lower die and pallet consist of locator pins adapted to engage notches of each said mask blank curled in the direction of its minor axis by a leveler to curvature corresponding to that of the cavity contour of said lower die.

5. An apparatus according to claim 1, wherein said takeout unit includes swing means for swinging horizontally through an angle of 90 deg. while carrying each said formed mask.

6. An apparatus according to claim 1, wherein said reversing means comprises a receiving plate for supporting each said formed mask taken out by said takeout means, reversing chucks for holding said mask on said plate, a pinion provided at one end of said receiving plate, and a rack meshed with said pinion to turn said plate upside down through an angle of 180 deg. in a vertical plane.

7. An apparatus according to claim 1, wherein said lower die and pallet are both equipped with locator means for locating said pad beam.

8. An apparatus according to claim 7, wherein said pad beam locator means of said lower die and pallet include guide pins, and said pad beam includes guide bushes engageable with said guide pins.

* * * * *